(12) United States Patent
Davey et al.

(10) Patent No.: US 9,149,166 B2
(45) Date of Patent: Oct. 6, 2015

(54) LOW ENERGY CENTRIFUGAL LIQUID-SOLID SEPARATOR SYSTEM

(75) Inventors: Jerry Davey, New Smyrna Beach, FL (US); Richard P. Escue, Port Orange, FL (US); Robert P. Kazanjy, Santa Ana, CA (US); Christopher D. Smith, South Daytona, FL (US)

(73) Assignee: Electronic Precipitation Systems, LLC, New Smyrna Beach, FL (US)

( * ) Notice: Subject to any disclaimer, the term of this patent is extended or adjusted under 35 U.S.C. 154(b) by 786 days.

(21) Appl. No.: 13/357,335

(22) Filed: Jan. 24, 2012

(65) Prior Publication Data

US 2012/0187032 A1    Jul. 26, 2012

Related U.S. Application Data

(60) Provisional application No. 61/435,585, filed on Jan. 24, 2011.

(51) Int. Cl.
*A47L 7/00* (2006.01)
*B01D 21/26* (2006.01)
*B08B 9/093* (2006.01)
*B04C 5/103* (2006.01)
*B04C 5/107* (2006.01)

(52) U.S. Cl.
CPC ............ *A47L 7/0009* (2013.01); *B01D 21/267* (2013.01); *B04C 5/103* (2013.01); *B04C 5/107* (2013.01); *B08B 9/0933* (2013.01)

(58) Field of Classification Search
CPC .. A47L 7/0009; B01D 21/267; B08B 9/0933; B04C 5/103; B04C 5/107
USPC ............... 210/196, 512.1; 209/727; 261/36.1, 261/DIG. 11; 134/103.2
See application file for complete search history.

(56) References Cited

U.S. PATENT DOCUMENTS 3,512,651 A    5/1970    Laval, Jr.
4,001,121 A    1/1977    Bielefeldt
(Continued)

FOREIGN PATENT DOCUMENTS

GB          2076315        12/1981

OTHER PUBLICATIONS

Lakos, TowerClean Systems, Spanish Edition, Form SLS-710A, dated Jan. 2007.*

(Continued)

*Primary Examiner* — David A Reifsnyder
(74) *Attorney, Agent, or Firm* — Marcus N. DiBuduo

(57) ABSTRACT

A sweeper assembly can include a plurality of holes drilled in one or more sweeper headers that can be angled downwards towards the basin floor to produce a gentle flow of fluid to keep particulate matter rolling along the basin floor. A centrifugal separator can include a curved velocity plate for smoothly directing flow from an inlet pipe to an inner wall of the separator and creating a downward vortex of particulate-laden fluid within the centrifugal separator. The centrifugal separator can include one or more reversal mechanisms for transferring particulate matter to a collection chamber and reversing the direction of particle-free fluid, which may upwardly exit through a discharge pipe. The centrifugal separator can include a bleed valve in the discharge pipe for automatically bleeding accumulated air in the "dead zone" between the inlet pipe and the top of the centrifugal separator.

76 Claims, 10 Drawing Sheets

(56) References Cited

U.S. PATENT DOCUMENTS

| | | |
|---|---|---|
| 4,072,481 A | 2/1978 | Laval, Jr. |
| 4,389,351 A * | 6/1983 | O'Brien .................. 261/36.1 |
| 5,028,318 A | 7/1991 | Aslin |
| 5,320,747 A | 6/1994 | Ford et al. |
| 5,368,735 A | 11/1994 | Ford |
| 5,569,379 A | 10/1996 | Schloss |
| 5,622,545 A | 4/1997 | Mazzei et al. |
| 5,635,068 A | 6/1997 | Marandi |
| 5,707,530 A | 1/1998 | Broussard, Jr. |
| 5,811,006 A | 9/1998 | Ford |
| 5,827,357 A | 10/1998 | Farion |
| 6,090,276 A | 7/2000 | Ford |
| 6,143,175 A | 11/2000 | Ford et al. |
| 6,167,960 B1 | 1/2001 | Moya |
| 6,202,543 B1 | 3/2001 | Moya et al. |
| 6,251,296 B1 | 6/2001 | Conrad et al. |
| 6,330,915 B1 | 12/2001 | Moya |
| 6,398,706 B1 | 6/2002 | Huang |
| 6,511,595 B2 | 1/2003 | Crompton et al. |
| 6,629,686 B2 | 10/2003 | Morse et al. |
| 6,966,985 B2 | 11/2005 | Schoenbrunn et al. |
| 7,025,890 B2 | 4/2006 | Moya |
| 7,232,525 B2 | 6/2007 | Eriksen |
| 7,285,212 B2 | 10/2007 | Arnaud |
| 7,335,313 B2 | 2/2008 | Moya |
| 7,465,391 B2 | 12/2008 | Heist et al. |
| 2004/0211734 A1 | 10/2004 | Moya |
| 2005/0167372 A1 | 8/2005 | Heist et al. |
| 2005/0218088 A1 | 10/2005 | Gonzalez et al. |
| 2007/0007214 A1 | 1/2007 | Zha et al. |
| 2008/0179227 A1 | 7/2008 | Saito |
| 2008/0230458 A1 | 9/2008 | Lean et al. |
| 2009/0294375 A1 | 12/2009 | Lange et al. |
| 2010/0012595 A1 | 1/2010 | Yang et al. |
| 2010/0140187 A1 | 6/2010 | Schook |
| 2010/0237018 A1 | 9/2010 | Hollebone et al. |

OTHER PUBLICATIONS

Lakos, High performance liquid-solids separation systems, Sep. 2004.
Kathy Colby, Today's Techniques for Heat Exhanger Protection Via Particle Filtration, Feb. 2009.
United Industries Inc, Tower Flo Water Filter Systems Basin Sweeping Piping Systems.
United Industries Inc, Tower Flo Clip-On Nozzle Holders.
Gordon D. Stubley, Mysteries of Engineering Fluid Mechanics, May 31, 2001.
Puroflux Corporation, PF-64 Series Packaged System Typical Open Tower Sweeper Piping Installation.
United Industries Inc, Tower Flo Sweeper-Eductor Nozzles.
Pep Filters, InterSeptor Series Sweeper Jet Systems, Jan. 2002.
Pep Filters, InterSeptor Centrifugal Separators Operating & Maintenance Manual, Apr. 8, 2005.
Lakos, Cooling Tower Filtration, Jun. 2001.
Lakos, TowerClean Systems, Nov. 2011.
Puroflex Corporation, PF-61 Series Separator, Feb. 2010.
Puroflex Corporation, PF-64LP Series 50 PSI Pump Package System.
United Industries Inc, Tower Flo Basin Sweeper Piping, Apr. 1998.

* cited by examiner

LOW ENERGY CENTRIFUGAL LIQUID-SOLID SEPARATOR SYSTEM

RELATED APPLICATIONS

This application claims the benefit of U.S. Provisional Patent Application No. 61/435,585, filed on Jan. 24, 2011, which is hereby incorporated by reference in its entirety.

BACKGROUND OF THE INVENTION

1. Field of the Invention

The present invention generally relates to the field of filtration systems. More specifically, embodiments of the present invention pertain to improved filtration systems for removing particulate matter from cooling tower basins.

2. Background and Description of Related Art

Some conventional cooling tower systems include (i) a sweeper located on the floor of the basin to assist in the buildup and removal of particulate matter and (ii) a centrifugal separator for separating particulate-laden fluid from the basin into fluid and particulate matter components. In some conventional systems, the filtering system is closed loop—namely, the fluid that has been separated from the particulate matter by the centrifugal separator may be recycled back into the sweeper.

Conventional sweeper assemblies may include a plurality of amplifying water jet sprayers, or eductors. The eductors may receive fluid from the fluid output of the centrifugal separator and direct said output towards a suction intake, effectively sweeping particulate matter across the basin floor. The eductors amplify the amount of fluid discharged from the nozzle—typically by a factor of 5—by drawing in fluid from the surrounding area in the basin along with fluid supplied via the fluid output of the centrifugal separator. In some conventional sweeper assemblies, the eductors are located around a peripheral edge of the basin floor and are directed towards the suction intake such the particulate-laden fluid can be removed therefrom.

Conventional centrifugal separators (such as that disclosed in U.S. Pat. No. 7,335,313, incorporated herein by reference) utilize centrifugal force and gravity to achieve varying degrees of separation of particulate from particulate/fluid mixtures. The separated particulates generally settle to the bottom of the centrifugal separator in a sediment chamber from which they are periodically removed. Some conventional separators employ a vortex system where the particulate/fluid mixture is introduced into a cylindrical chamber at a tangential angle generating centrifugal action in the mixture. Some conventional separators include a spin plate at the bottom of a vortex tube that reverses the axial direction of flow. The separated fluid exits through a smaller tube provided at the top of the cylindrical chamber, while the solids settle below the spin plate in the sediment chamber.

Unfortunately, it has been determined that the use of eductors introduces turbulence in the basin which decreases the cleaning effectiveness. The trend in conventional approaches is to increase the number or eductors and/or the output volume or pressure requirements, both of which increase the cleaning system power requirements. It is to be appreciated that conventional use of eductors requires significant system pressure which in turn significantly increases operational costs. For example, in order to achieve a 5:1 amplification power, the eductors require system pressure of about 20 psig.

It has also been determined that conventional vortex-based centrifugal separators introduce turbulence within the separator body, also decreasing the cleaning effectiveness. It is believed that appreciable turbulence is introduced by (i) the introduction of the particulate/fluid mixture, (ii) vibratory action at specific flow velocities, and (iii) the accumulation of air in the dead zone above the inlet. This increased turbulence increases the horsepower requirement for the suction pump, also increasing the total cleaning system power requirements.

It is therefore desirable to provide sweepers, separators, and cleaning systems having reduced fluid turbulence.

SUMMARY OF THE INVENTION

Embodiments of the present invention relate to improved sweepers, centrifugal separators, and systems incorporating the same.

In some aspects, a sweeper can include a plurality of holes drilled in a sweeper header producing a steady, gentle flow of water with sufficient force to keep sand and debris rolling along the bottom of the basin to a point where they can be received by a suction manifold. In some embodiments, the holes can have a diameter of about ¼". In some embodiments, the distance between adjacent holes along the length of the sweeper header can be between about 6" to 18", center-to-center. Advantageously, the inclusion of the plurality of holes in the sweeper header (in contrast to conventional use of eductors) reduces the system pressure requirement to provide proper sweeping action. In some implementations, a system pressure of between about 2.5 to 4.0 psig on a sweeper header in accordance with some embodiments of the present invention may be sufficient to provide proper sweeping action.

In some embodiments, the sweeper header can be vertically offset from the basin floor. In some other embodiments, the sweeper header can be placed near the bottom of the basin floor. In some embodiments, the holes can be angled about parallel to the basin floor. In some other embodiments, the holes can be angled downward between about 5 to 35 degrees measured horizontally to the basin floor. In some embodiments, the plurality of holes can have non-uniform angles (e.g., some holes may be angled downward at about 5 degrees measured horizontally to the basin floor and other holes may be angled downward at about 35 degrees measured horizontally to the basin floor).

In some embodiments, a single sweeper header can be positioned at or near a peripheral edge of the basin floor. In some other embodiments, a sweeper assembly can include a plurality of sweeper headers laterally spaced along the basin floor.

In some embodiments, the suction pickup header can include openings or holes drilled therein and facing the holes in the sweeper header. In some embodiments, the holes in the suction pickup header can have a diameter of about ¼". In some embodiments, the holes can be angled about parallel to the basin floor. In some other embodiments, the holes can be angled downward between about 5 to 35 degrees measured horizontally to the basin floor. In some other embodiments, the holes can be angled upward between about 5 to 35 degrees measured horizontally to the basin floor. In some embodiments, the plurality of holes can have non-uniform angles (e.g., some holes may be angled downward at about 20 degrees measured horizontally to the basin floor and other holes may be angled upward at about 15 degrees measured horizontally to the basin floor).

In some aspects, a centrifugal separator can include an air bleed for bleeding air from the dead zone above the inlet. In some embodiments, the air bleed can include an air vent hole that is drilled in the discharge tube. In some embodiments, the vent hole can have a diameter of about ⅜".

In some embodiments, the inlet to the centrifugal separator can include a curved velocity plate for smoothly directing flow to an inside wall of a velocity chamber and creating a downward vortex of particulate-laden fluid.

In some embodiments, the velocity chamber of the centrifugal separator can lack a bottom plate. In some other embodiments, a bottom place can be included and annulus can be provided on the outer chamber wall to allow particulates to be swept out of the velocity camber and into the main body of the separator.

In some embodiments, one or more reversal mechanisms can be provided to reverse the fluid vortex while centrifugally removing the particulate therefrom. In some embodiments, the reversal mechanism can be a spin plate, a spin cone, cross members, vanes, a deflection plate, and/or a funnel. In some embodiments, the reversal mechanism can have a diameter about equal to an inner diameter of the main body portion of the centrifugal separator. In some other embodiments, the reversal mechanism can have a diameter less than a diameter of the main body portion of the centrifugal separator. In some embodiments, one or more holes can be provided in the reversal mechanism to collect the centrifugal flow of particulate matter and allow such particulate matter to fall into the collection chamber.

It is to be appreciated that by reducing turbulence present in conventional sweeper assemblies and centrifugal separators, significant energy savings can be realized without significant degradation in cleaning ability.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The invention, in its various aspects, will be explained in greater detail below. While the invention will be described in conjunction with several exemplary embodiments, the exemplary embodiments themselves do not limit the scope of the invention. Similarly, the exemplary embodiments as illustrated in the accompanying drawings, where like elements have like numerals, do not limit the scope of the exemplary embodiments and/or invention. Rather the invention, as defined by the claims, may cover alternatives, modifications, and/or equivalents of the exemplary embodiments.

Figure 1:
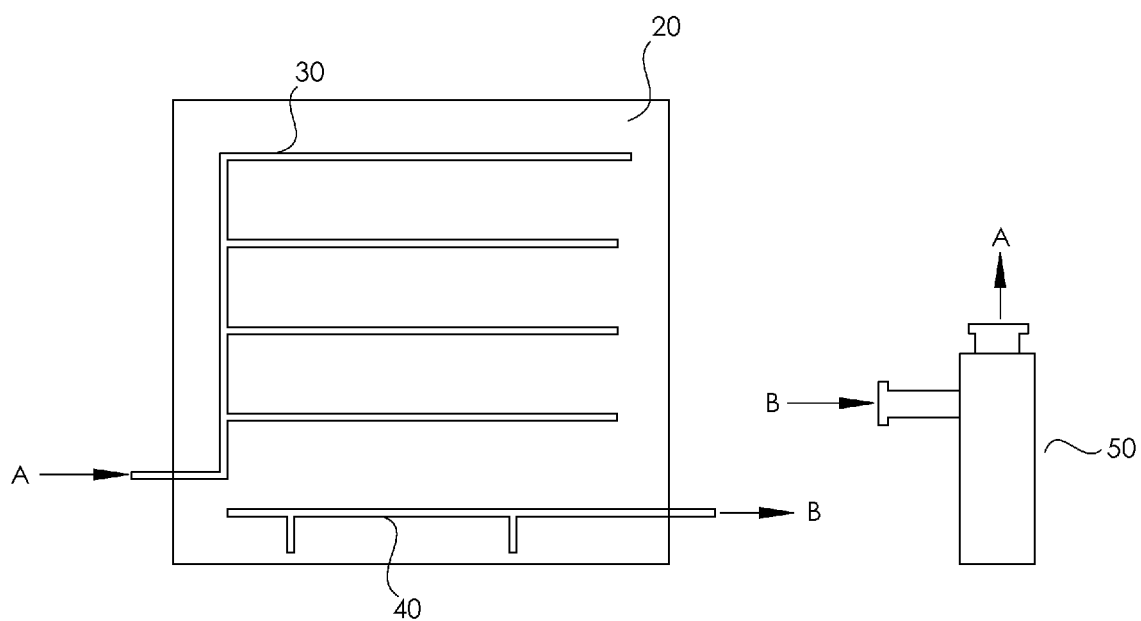
FIG. 1 is a diagram illustrating an exemplary system in accordance with some embodiments of the present invention.

Referring to the illustration of FIG. 1, in preferred embodiments, a cooling basin liquid-solid separator system may include a sweeper assembly 30 on one side of a basin floor 20 for gently sweeping debris towards a suction assembly 40. In some preferred embodiments, debris and fluid from suction assembly 40 may be discharged therefrom at B and received by a centrifugal liquid-solid separator 50. The centrifugal separator filters the debris from the fluid, where the fluid may be discharged at A and received by sweeper assembly 30.

Exemplary Sweeper

Figure 2:
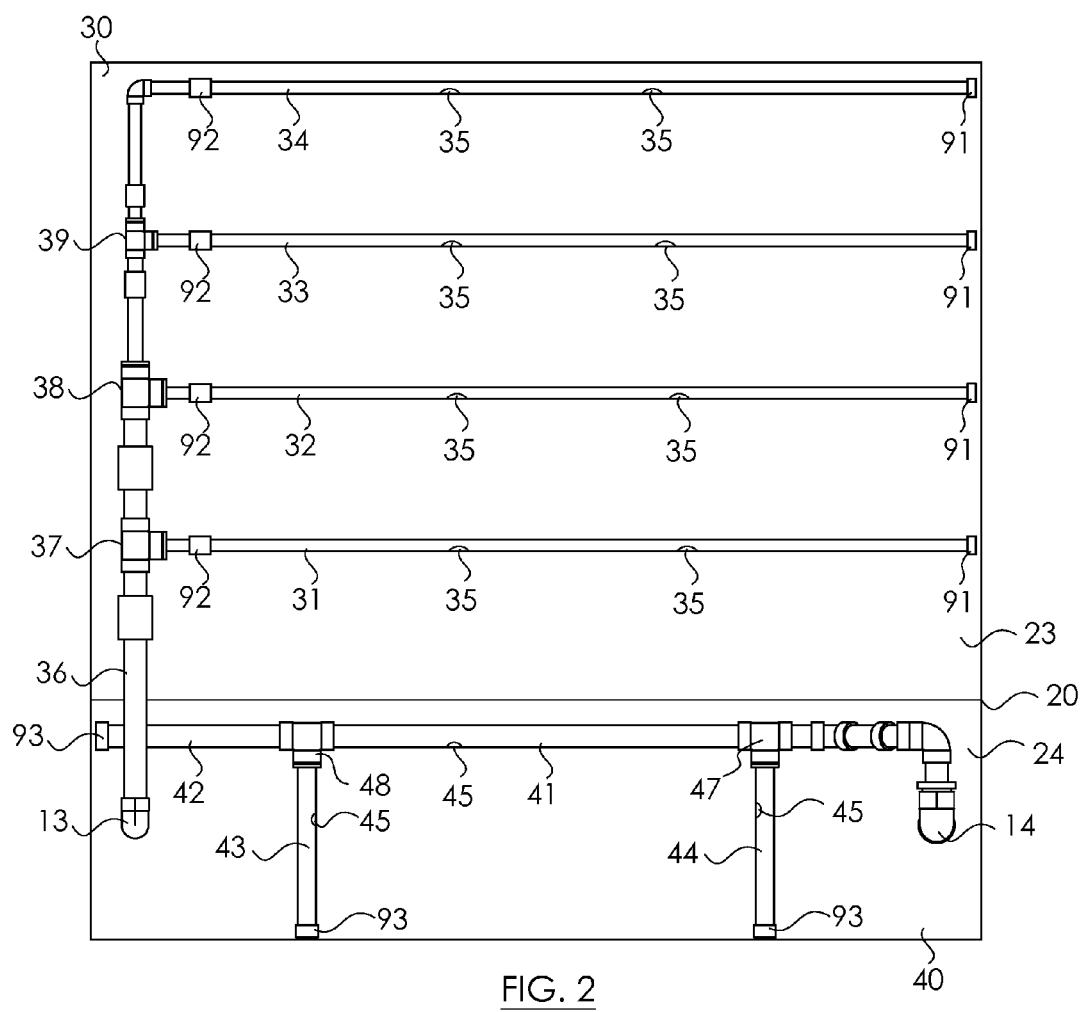
FIG. 2 is a diagram illustrating an exemplary sweeper in accordance with some embodiments of the present invention.

Referring generally to FIGS. 2, 3, 4, and 5A-5C, and specifically to FIG. 2, in some embodiments, an exemplary sweeper can include sweeper assembly 30 and suction assembly 40. In some embodiments, the exemplary sweeper can be positioned in basin floor 20 that can include sweeper section 23 and suction section 24. In some embodiments, sweeper assembly 30 may be positioned substantially in basin sweeper section 23 and suction assembly 40 may be positioned substantially in basin suction section 24. As discussed herein, the sweeper assembly may be adapted to direct a fluid flow causing settled debris to "sweep" from the floor of the basin sweeper section towards the floor of the basin suction section, wherein the debris may be removed by the suction assembly. In some implementations, sweeper section 23 and suction section 24 of basin floor 20 can be coplanar. In some other implementations, sweeper section 23 may be raised above suction section 24.

In some embodiments sweeper assembly 30 may comprise one or more sweeper headers (for example, and without limitation, sweeper headers 31, 32, 33, and 34), and a sweeper manifold (for example, and without limitation, sweeper manifold 36). In some embodiments, the sweeper headers can be laterally provided along basin floor 20 in sweeper section 23. Although the exemplary sweeper assembly of FIG. 2 illustrates four sweeper headers (i.e., sweeper headers 31, 32, 33, 34), it is to be appreciated that any number of sweeper headers can be provided in accordance with some embodiments of the present invention. In some embodiments, when multiple sweeper headers are provided, they can be laterally spaced by about two feet. However, it is to be appreciated that other spacing of lateral sweeper headers are contemplated in accordance with some embodiments of the present invention. It is also to be appreciated that the lateral spacing of adjacent sweeper headers may be constant or may vary. For example, and without limitation, the lateral spacing between sweeper header 31 and sweeper header 32 may be about one foot, and the lateral spacing between each sweeper headers 32, 33, 34 may be about three feet.

Figure 3C:
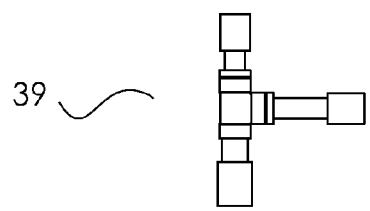
FIGS. 3A-3C are diagrams illustrating some exemplary sweeper manifold couplings in accordance with some embodiments of the present invention.
Figure 3B:
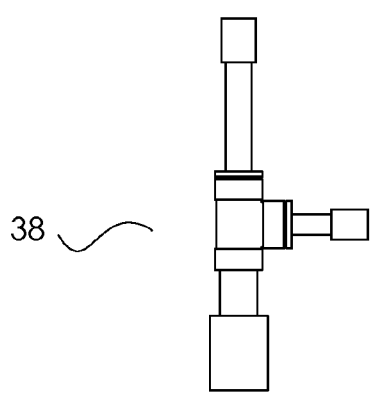
Figure 3A:
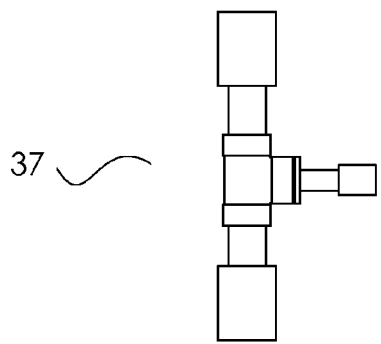
Figure 5B:
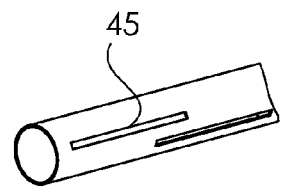
Figure 5C:
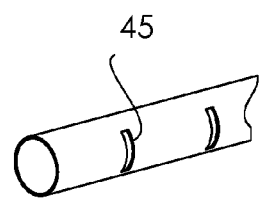
Figure 6D:
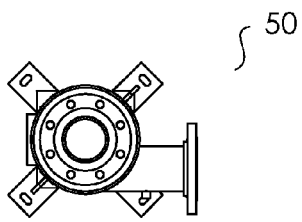
FIGS. 6A-6D are perspective, front, side, and top view diagrams, respectively, illustrating an exemplary centrifugal separator in accordance with some embodiments of the present invention.
Figure 6C:
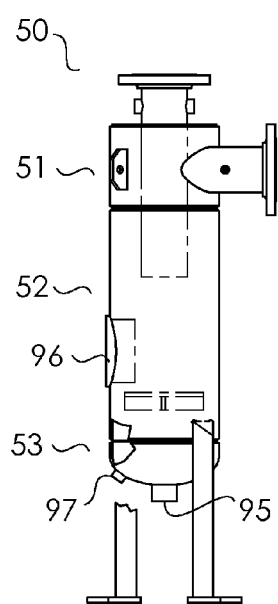
Figure 6B:
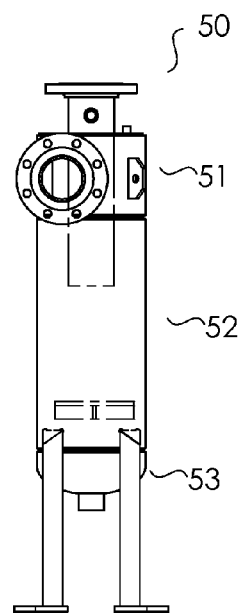
Figure 6A:
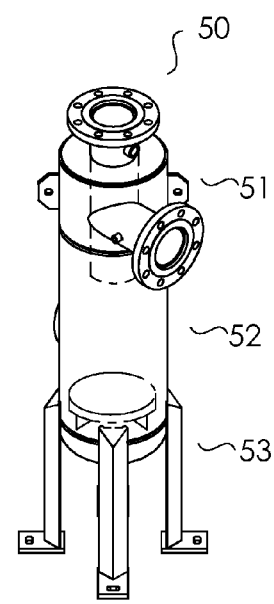

In some embodiments, and as shown in the example of FIG. 2, the sweeper headers may be connected on one end to manifold assembly 36 comprising one or more lateral connections or couplings (for example, and without limitation, manifold 36 may include couplings 37, 38, 39) engaging the sweeper headers (for example, and without limitation, sweeper headers 31, 32, 33, 34). In preferred embodiments, the diameter of manifold 36 incrementally decreases along the length thereof to accommodate about equal pressure at the inputs to the individual sweeper headers. For example, and without limitation, inlet 13 to the manifold may have a diameter of 3" while coupling 39 of manifold 36 supplying sweeper header 34 may have a diameter of 1.5". Referring now to FIGS. 3A, 3B, and 3C, it can be seen that in some implementations, and without limitation, couplings 37, 38, 39 may comprise T-shaped connections. In some embodiments, coupling 37 may be positioned closest to the manifold inlet, coupling 38 may engage a distal end of coupling 37, and coupling 39 may engage a distal end of coupling 38. In some implementations, the diameter of coupling 37 can be greater than the diameter of coupling 38 which may be greater than the diameter of coupling 39. As illustrated in FIG. 2, in some embodiments, the sweeper headers may be engaged on proximal ends to manifold 36 though slip couplings 92. The sweeper headers may also have endcaps 91 on distal ends thereof. It is to be appreciated that those of ordinary skill in the art can determine the diameter of the manifold portions with reference to, among other things, the number and spacing of the sweeper headers, the volumetric flow rate through each sweeper header, and the desired fluid pressure of each sweeper header, in accordance with some embodiments of the present invention.

Figure 4:
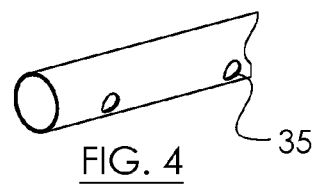
FIG. 4 is a diagram illustrating an exemplary sweeper header in accordance with some embodiments of the present invention.

In some embodiments, each sweeper header may include one or more openings for expelling fluid therefrom. As illustrated in the example of FIG. 4, for example and without limitation, each sweeper header 31, 32, 33, 34 may have a plurality of holes 35 drilled therein for directly communicating the fluid from inlet 13 into and on sweeper section 23 of basin floor 20. In some implementations, the holes may be about ¼" in diameter. However, it is to be appreciated that other hole diameters are contemplated in accordance with some embodiments of the present invention. For example, and without limitation, the holes may be ⅛" in diameter. In preferred embodiments, the plurality of holes 35 of the sweeper headers may be uniform along the length of the sweeper header and may have a pattern that is the same as different laterally spaced sweeper headers. However, it is to be appreciated that holes of varying sizes may be provided on one or more sweeper headers. For example, and without limitation, sweeper header 34 may have holes having diameters of ¼" and ½" while sweeper header 31 may have holes that are ⅛" in diameter. It is to be appreciated however that other types of openings are contemplated in accordance with some embodiments of the present invention. For example, and without limitation, one or more of the sweeper header openings may comprise slots.

In some implementations, and without limitation, the center-to-center spacing between adjacent holes 35 is about 10". However, it is to be appreciated that other center-to-center spacings are contemplated in accordance with some embodiments of the present invention. For example, and without limitation, the spacings may be between about 6" to about 18". In some preferred embodiments, the spacing between adjacent holes 35 is constant along the length of a sweeper header. In some preferred embodiments, the spacing between adjacent holes 35 may have a pattern that is the same as different laterally spaced sweeper headers. However, it is to be appreciated that the spacing between adjacent holes may vary both along the length of an individual sweeper header and amongst different laterally spaced sweeper headers. For example, and without limitation, the spacing between adjacent holes 35 on sweeper header 34 may vary from about 6" on the outside edges to about 18" in the center thereof. In some further examples, the spacing between adjacent holes 35 on sweeper header 31 may be constant at 10" and the spacing between adjacent sweeper holes 35 on each sweeper headers 32, 33, 34 may vary between 6" to 18". It is to be appreciated that other adjacent hole variations are contemplated in accordance with some embodiments of the present invention.

In some embodiments, and as illustrated in the example of FIG. 2, the holes of the plurality of sweeper headers may be aligned or may have the same pattern. For example, and without limitation, each sweeper header 31, 32, 33, 34 may have a first hole about 6" from the manifold, and second, third, etc. holes about 10" from the first hole. However, in some embodiments, the holes of adjacent sweeper headers can be staggered or non-uniform. For example, and without limitation, holes 35 of sweeper headers 31, 32, 33, and 34 may begin about 1", 2", 3", and 4", respectively, from manifold 36 and/or slip coupling 92.

In some embodiments, the holes drilled in the sweeper header may be drilled so as to provide a flow about horizontal or parallel to the basin floor. In some embodiments, and without limitation, holes 35 may be drilled exactly radially inward ninety degrees from the bottom of the sweeper headers. In some other embodiments, holes 35 may be drilled at an angle downward from the horizontal or parallel of the basin floor so as to provide proper impact with the bottom of the basin floor. In some preferred embodiments, holes 35 may be angled downwards between about 5 to about 35 degrees. For example, and without limitation, holes 35 may be angled downwards about 20 degrees. However, it is to be appreciated that other angles are contemplated in accordance with some embodiments of the present invention.

It is further to be appreciated that the angles of holes 35 may be uniform or non-uniform along the length of the sweeper header in accordance with some embodiments of the present invention. For example, and without limitation, holes on the outside edges of the sweeper headers may be angled downwards from the horizontal by about 45 degrees and the remaining holes may be angled downwards from the horizontal by about 20 degrees. In some embodiments, the angles of holes 35 may be form a uniform or non-uniform pattern amongst different laterally spaced sweeper headers. For example, and without limitation, holes 35 on sweeper header 34 may be angled downwards from the horizontal by about 30 degrees, holes 35 of sweeper header 33 may be angled downwards by about 25 degrees, and the holes in sweeper headers 32, 31 may be angled downwards by about 10 degrees. It is to be appreciated that other hole angles and combinations thereof in accordance with some embodiments of the present invention.

In some embodiments, the holes in the sweeper headers may be drilled so as to provide a flow about perpendicular to the sweeper headers. However, it is to be appreciated that the holes may be drilled so as to provide a flow that is not perpendicular to the sweeper headers. For example, and without limitation, the holes may be drilled such that the flow from the plurality of sweeper headers converge and focus on a few points along the suction manifold.

It is to be appreciated that holes 35 in the sweeper headers of sweeper assembly 30 effectively "sweep" settled debris off basin sweeper section 23 and towards basin suction section 24 where it may be picked up by suction assembly 40. In some embodiments, and without limitation, suction assembly 40 may comprise one or more suction manifold sections (for example, and without limitation, suction manifolds 41, 42, 43, 44) joined by suction manifold couplings (for example, and without limitation, suction manifolds 47, 48). In some embodiments, endcaps 93 may be positioned on distal ends of the manifold sections.

In some embodiments, each suction manifold section may include one or more openings for removing debris-laden liquid from basin suction section 24 and discharging it though suction header outlet pipe 14. Referring to the exemplary illustration of FIG. 2, for example and without limitation, in some embodiments, plurality of holes 45 may be drilled in the suction manifold. In some embodiments, holes 45 can have a diameter of about ¼". However, other hole diameter sizes are contemplated in accordance with embodiments of the present invention.

Figure 5A:
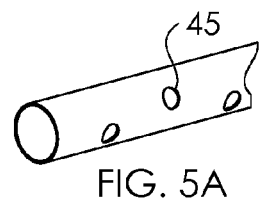
FIG. 5A-5C are diagrams illustrating exemplary suction manifolds in accordance with some embodiments of the present invention.

In some embodiments, adjacent holes drilled in the suction manifold may be provided in alternating angles measured from the horizontal or basin floor. As illustrated in the illustration of FIG. 5A, for example and without limitation, adjacent holes may be angled upwards at 20 degrees and downwards at 20 degrees, each measured from the horizontal. In some other embodiments, the holes in the suction manifold may have a constant angle (similar to the exemplary holes of the sweeper header as illustrated in FIG. 4). For example, and without limitation, each hole in the suction manifold may be angled about horizontal or parallel to the basin floor. However, it is to be appreciated that other angles and combinations thereof are contemplated in accordance with some embodiments of the present invention. It is also to be appreciated that other types of openings in the suction manifold are contemplated in accordance with some embodiments of the present invention. Referring to the illustration of FIGS. 5B and 5C, for example and without limitation, the suction manifold sections may include one or more slots. In some embodiments, slots 45 may be perpendicular to the suction manifold sections. In some other embodiments, slots 45 may be parallel to the suction manifold sections. In some other embodiments, the slots may be angled from the horizontal to the basin floor. In some other embodiments, one or more of the suction manifold sections may have any combination of perpendicular, parallel, or angled slots.

It is to be appreciated that the volumetric flow rate of fluid exiting the plurality of openings in the sweeper headers should be about equal to the volumetric flow of the fluid entering the plurality of openings in the suction manifold sections. Thus, the number and cross sectional areas of openings in the sweeper assembly is correlated to the number and cross sectional areas of openings in the suction assembly.

Exemplary Separator

Figure 7:
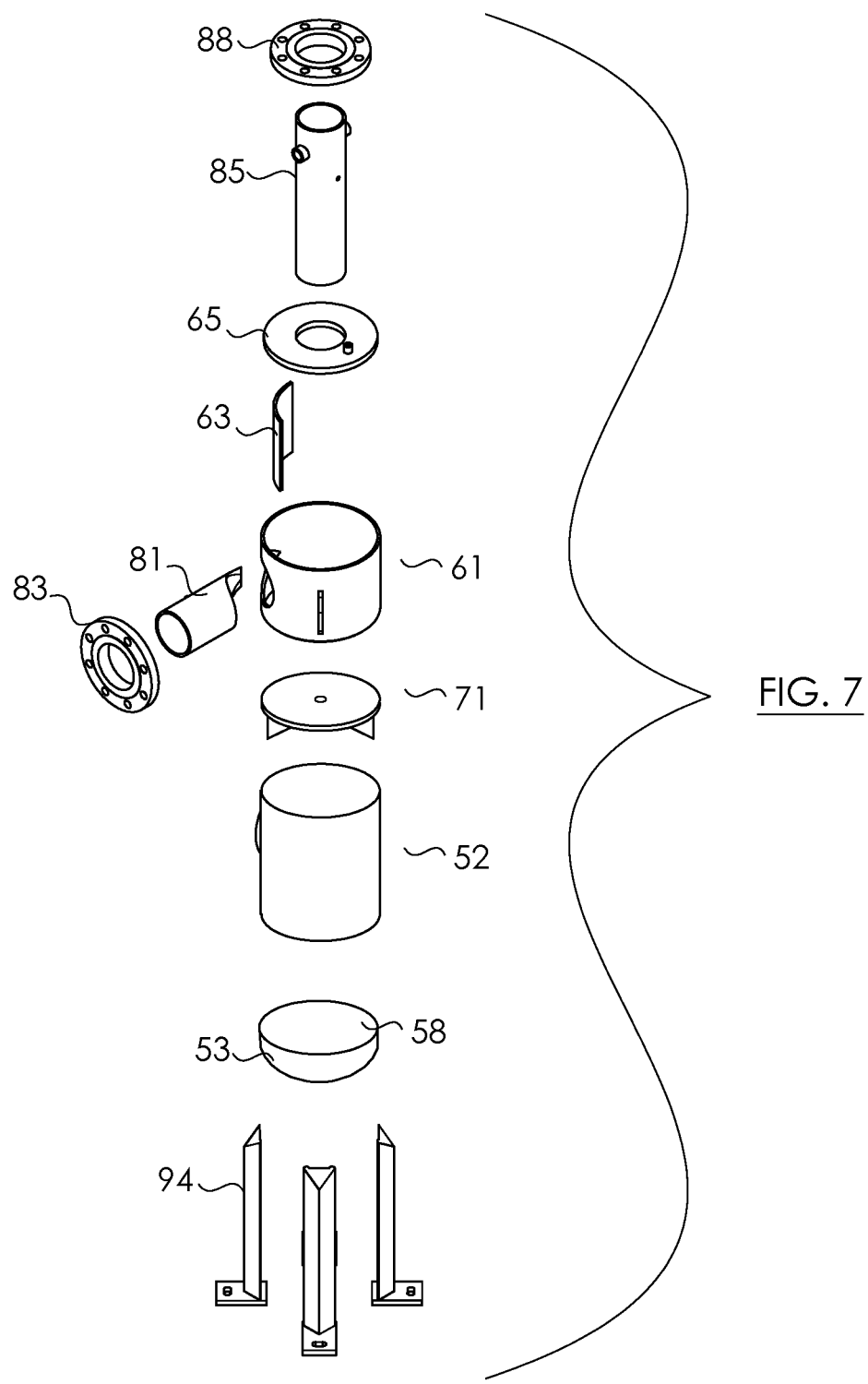
FIG. 7 is an exploded diagram illustrating an exemplary separator in accordance with some embodiments of the present invention.

Referring generally to FIGS. 6-21, in some embodiments, an exemplary centrifugal separator can include a generally cylindrical vessel or housing. As illustrated in the illustrations of FIGS. 6A-6D, in some embodiments centrifugal separator 50 can include large vessel comprising top portion 51, main body portion 52, and bottom portion 53. In some embodiments, centrifugal separator 50 may be positioned generally upright, and may be supported by one or more support structures (for example, and without limitation, support structures 94 as illustrated in FIG. 7). In some implementations, and without limitation, the support structures may comprise a plurality of legs that can be welded on main body portion 52. In some embodiments, main body portion 52 may comprise cleanout door 96 providing access to the interior section of main body portion 52. In some embodiments, bottom portion 53 of cylindrical separator may include a purge outlet 95 for discharging sediment or particles (for example, and without limitation, particulate matter that has been swept or removed from the basin floor of the exemplary sweeper as discussed above). In some embodiments, the centrifugal separator may also comprise one or more additional ports. For example, and without limitation, port 97 may be provided on bottom portion 53 of centrifugal separator. In some embodiments, an anti-corrosion coupon may be inserted into port 97. It is to be appreciated however that support structures 53, cleanout door 96, and/or port 97 may be provided elsewhere on centrifugal separator 50 in accordance with some embodiments of the present invention. For example, and without limitation, port 97 may be provided on main body portion 52 or top portion 51.

Referring now to the exploded illustration of FIG. 7, in some preferred embodiments, centrifugal separator 50 may comprise cylindrical velocity chamber 61, cylindrical main body portion 52, and a collection or sediment chamber 58. In some preferred embodiments, top portion 51 of centrifugal separator 50 may comprise velocity chamber 61. For example, and without limitation, velocity chamber 61 may comprise a cylindrical housing that is engaged to a top portion of main body portion 51 of centrifugal separator. In some other embodiments, the velocity chamber may comprise a separate cylindrical housing that may be disposed inside of top portion 51 of centrifugal separator 50. In some embodiments, bottom portion 53 of centrifugal separator 50 may comprise sediment chamber 58. In some other embodiments, the sediment chamber may comprise a separate housing that may be disposed inside of bottom portion 53 of centrifugal separator 50.

In some embodiments, lateral inlet pipe 81 (which may have flange 53 mounted thereon) may be provided near the top of centrifugal separator 50 for receiving an incoming fluid stream containing a particulate-laden fluid (for example, and without limitation, fluid from outlet pipe 14 of suction assembly 40 as illustrated in FIG. 2). In some preferred embodiments, inlet pipe 81 may be attached to centrifugal separator 50 in such a way that the fluid flow is introduced into velocity chamber 61 near an inner cylindrical wall thereof. In some embodiments, upper discharge pipe 85 (which may have flange 88 mounted thereon) may be provided near the top of centrifugal separator 50 for discharging fluid having particulate matter removed therefrom (for example, and without limitation, to inlet pipe 13 of sweeper assembly 30 as illustrated in FIG. 2).

Figure 9:
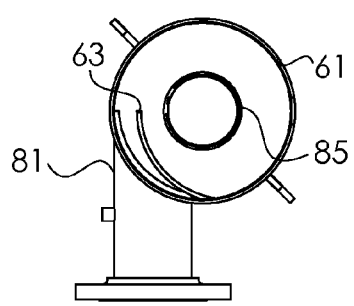
FIG. 9 is a diagram illustrating an exemplary velocity chamber in accordance with some embodiments of the present invention.
Figure 10B:
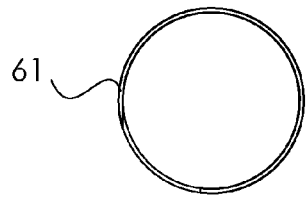
FIGS. 10A-10B are front and top view diagrams, respectively, of an exemplary velocity chamber in accordance with some embodiments of the present invention.
Figure 10A:
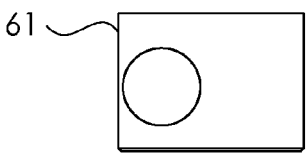
Figure 11:
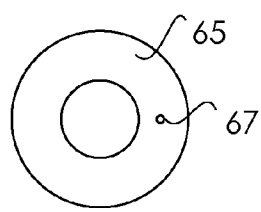
FIG. 11 is a diagram illustrating an exemplary top cap of a velocity chamber in accordance with some embodiments of the present invention.
Figure 14B:
FIGS. 14A-14B are side and top view diagrams illustrating an exemplary velocity plate in accordance with some embodiments of the present invention.
Figure 14A:
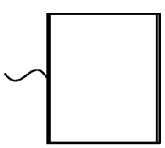

In some advantageous embodiments, curved velocity plate 63 may be provided to smoothly direct flow from inlet pipe 81 to an inside cylindrical wall of velocity chamber 61. It is to be appreciated that in contrast to inlets of conventional separators, velocity plate 63 permits reduced turbulence inlet of the particulate-laden fluid into centrifugal separator 50. In some embodiments, and without limitation, velocity plate 63 can have a radius about equal to a radius of velocity chamber 61. However, it is to be appreciated that other radii are contemplated in accordance with some embodiments of the present invention. As illustrated in the illustration of FIG. 9, in some examples and without limitation, velocity plate 63 may be positioned such that the particulate-laden fluid exiting from inlet pipe 81 may be constricted through a smaller cross sectional area defined by the inside cylindrical wall of velocity chamber 61 and an edge of velocity plate 63. It is to be appreciated that such positioning effectively increases the fluid pressure thereby increasing the velocity of the particulate-laden fluid as it enters the velocity chamber 61. As such, rotational flow is imparted on the particulate-laden fluid inside velocity chamber 61.

Referring back to the exemplary illustration of FIG. 7, upper discharge pipe 85 may be provided near the top of centrifugal separator 50 leading from main body portion 52 to the exterior and axially positioned through and within velocity chamber 61. In some embodiments, velocity chamber 61 may include top cap 65. In some embodiments, top cap 65 may define an upper internal boundary of centrifugal separator 50.

Figure 8C:
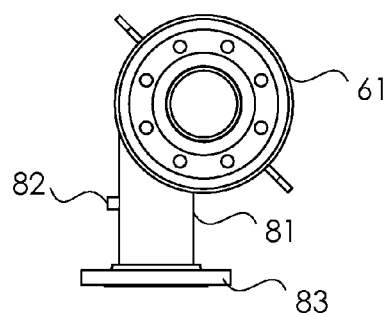
FIGS. 8A-8C are perspective, front, and top view diagrams, respectively, illustrating an exemplary top portion of a centrifugal separator in accordance with some embodiments of the present invention.
Figure 8A:
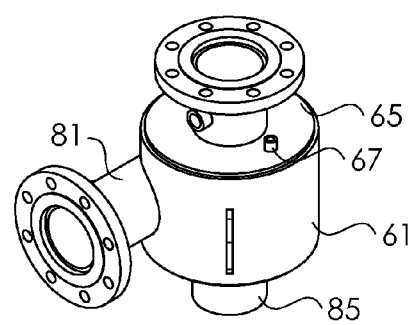
Figure 8B:
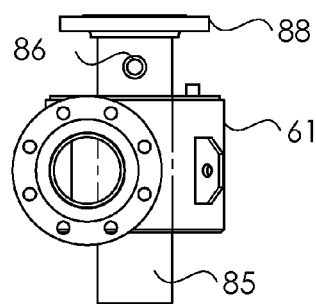

Referring now to the illustrations of FIGS. 8A-8C, in some embodiments, discharge pipe 85 may be axially positioned within velocity chamber 61. In some implementations, a top portion of discharge pipe 85 may extend above top cap 65 of velocity chamber 61 and a bottom portion of discharge pipe 85 may extend below a bottom portion of velocity chamber 61. In some embodiments, velocity chamber 61 may also include a bottom plate (not shown) engaged with the bottom portion of velocity chamber 61. Annulus, cooperating with the bottom plate, may be provided on the wall of velocity chamber 61 to allow larger particles to be swept out of velocity chamber 61 and into main body housing 52 of centrifugal separator 50. As above, in some embodiments, inlet pipe 81 may be positioned such that fluid flowing therefrom is introduced near an inner cylindrical wall of velocity chamber 61.

Figure 13:
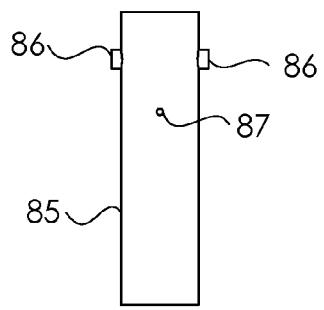
FIG. 13 is a diagram illustrating an exemplary discharge pipe in accordance with some embodiments of the present invention.
Figure 12:
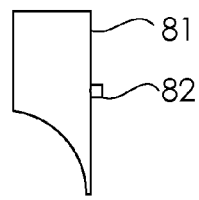
FIG. 12 is a diagram illustrating an exemplary inlet pipe in accordance with some embodiments of the present invention.

In some advantageous embodiments, top cap 65 may include at least one air bleed 67 permitting passage of accumulated air bubbles at the top of velocity chamber 61. In some advantageous embodiments, discharge pipe 85 may include at least one air bleed (for example, air bleed 87 as illustrated in FIG. 13) permitting passage of accumulated air bubbles. In some embodiments, air bleed 87 may comprise a hole. In some implementations, and without limitation, hole 87 may have a diameter of 3/8" and may be positioned between about 1" to 2" from the upper internal surface of top cap 65. However, other sizes and positions of air bleeds in the discharge pipe 85 and/or top cap 65 are contemplated in accordance with some embodiments of the present invention. It is to be appreciated that air bleeds provided in the discharge pipe and/or the top cap of the velocity chamber advantageously reduce turbidity within the centrifugal separator by removing air bubbles therefrom.

In some embodiments, one or more ports may be provided on the inlet pipe and/or discharge pipe of a centrifugal separator. For example, and without limitation, port 82 may be provided on inlet pipe 81 and/or port 86 may be provided on discharge pipe 85. In some embodiments, monitors (for example, and without limitation, pressure and/or flow monitors) may be engaged with the ports.

Figure 15A:
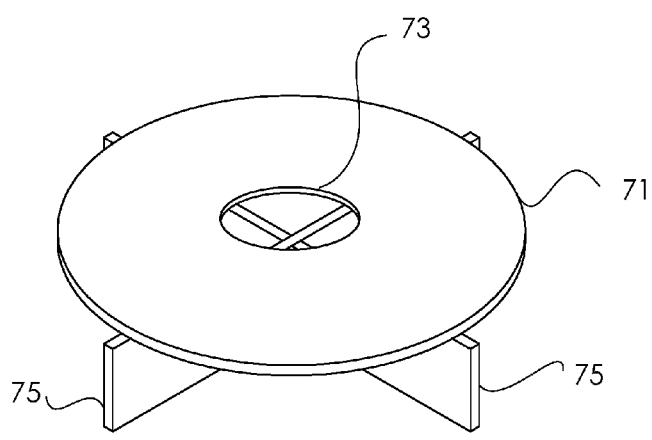
FIGS. 15A-15C are perspective, side, and bottom view diagrams, respectively, illustrating an exemplary reversal mechanism in accordance with some embodiments of the present invention.
Figure 16:
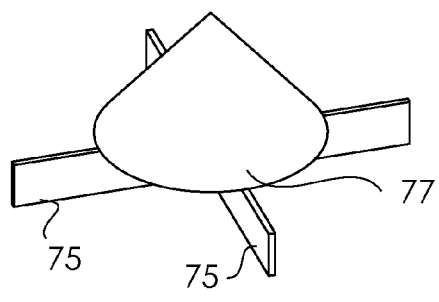
FIG. 16 is a diagram illustrating another exemplary reversal mechanism in accordance with some embodiments of the present invention.
Figure 17:
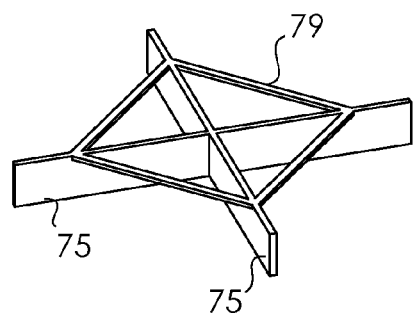
FIG. 17 is a diagram illustrating another exemplary reversal mechanism in accordance with some embodiments of the present invention.
Figure 18:
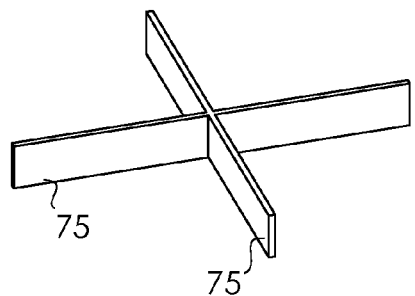
FIG. 18 is a diagram illustrating another exemplary reversal mechanism in accordance with some embodiments of the present invention.
Figure 19:
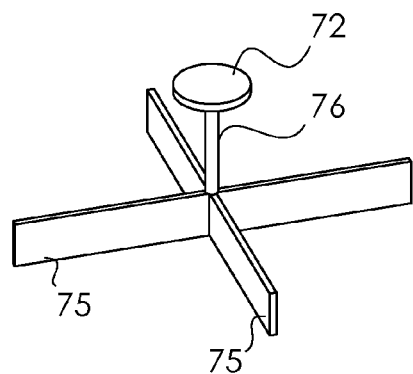
FIG. 19 is a diagram illustrating another exemplary reversal mechanism in accordance with some embodiments of the present invention.
Figure 20:
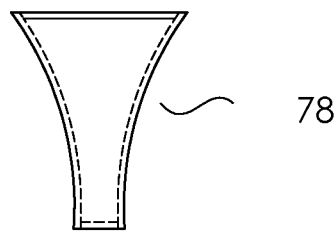
FIG. 20 is a diagram illustrating another exemplary reversal mechanism in accordance with some embodiments of the present invention.

Referring back to the illustration of FIG. 7, in some embodiments one or more reversal mechanisms may be centrally located and axially positioned in main body portion 52 of centrifugal separator 50. In some embodiments, the reversal mechanism may comprise a spin plate (for example, and without limitation, spin plate 71 as illustrated in the example of FIG. 15A). In some embodiments, the reversal mechanism may comprise a spin cone (for example, and without limitation, spin cone 77 as illustrated in the example of FIG. 16). In some embodiments, the reversal mechanism may comprise a spin grid (for example, and without limitation, spin grid 79 as illustrated in the example of FIG. 17). In some embodiments, the reversal mechanism may comprise arrestor vanes (for example, and without limitation, arrestor vanes 75 as illustrated in the example of FIG. 18). In some embodiments, the reversal mechanism may comprise a deflection plate (for example, and without limitation, deflection plate 72 as illustrated in the example of FIG. 19). In some embodiments, the reversal mechanism may comprise a funnel (for example, and without limitation, funnel 78 as illustrated in the example of FIG. 20).

In It is to be appreciated that, in accordance with some embodiments of the present invention, particle-laden fluid introduced from inlet pipe 81 may be introduced near an inside wall of velocity chamber 61 by velocity plate 63, and thusly creating a downward vortex within centrifugal separator 50. In some embodiments, the induced vortex converges upon the reversal mechanism in main body portion 52, reversing the direction of the vortex, and resulting therefrom, the solid particles are centrifugally separated from the fluid and fall into sediment chamber 58 while the fluid returns upwards and out discharge pipe 85. Thus, it is further to be appreciated that other reversal mechanisms (and combinations thereof) for reversing the direction of the vortex are contemplated in accordance with some embodiments of the present invention.

In some embodiments, an outside diameter of the reversal mechanism may be smaller than an inner diameter of the cylindrical main body portion of the centrifugal separator such that an annular gap is provided between the outer edge of the reversal mechanism and the inside wall of the cylindrical main body portion. In some other embodiments, the reversal mechanism may have an outside diameter that is equal to the inside diameter of the main body portion of the centrifugal separator such that no annular gap is provided.

Figure 15B:
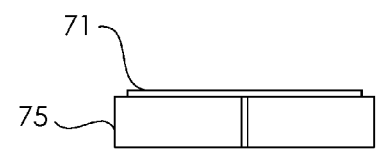
Figure 15C:
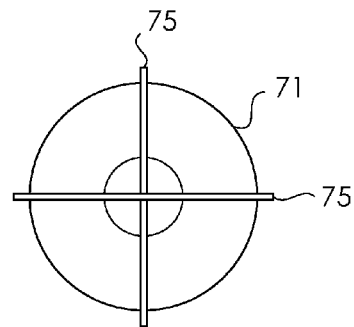

In some embodiments, and as illustrated in the example of FIGS. 15A-15C, the reversal mechanism may comprise spin plate 71. In some embodiments, spin plate 71 may be supported by arrestor vanes 75 for slowing the rotational flow of the particulate matter and/or particulate laden fluid in sediment chamber 58. In some embodiments, spin plate 71 may have a flat surface. However, it is to be appreciated that spin plate 71 may have other shapes. For example, and without limitation, spin plate 71 may have a slightly conical, convex, or concave shape. In some advantageous embodiments of the present invention, one or more holes may be provided in the spin plate for allowing particulate matter to transfer between the main body of the centrifugal separator and the collection chamber. In some embodiments, one or more holes may be positioned in the axial center of spin plate. For example, and without limitation, hole 73 may be positioned in the center of spin plate 71. In other examples, the spin plate can include a first centrally located hole and a plurality of holes circumscribing the centrally located hole. In some embodiments, each of the holes may have the same diameter. In some other embodiments, the holes may have diameters of varying sizes. For example, and without limitation, the spin plate can have a smaller centrally located hole and a plurality of larger circumscribing holes. It is to be appreciated that spin plates having other numbers, sizes, and positions of holes are contemplated in accordance with some embodiments of the present invention.

In some other embodiments, and as illustrated in the example of FIG. 16, the reversal mechanism may comprise spin cone 77. In some embodiments, spin cone 77 may be engaged with vanes 75 which may direct all particles into sediment chamber 58 and prevent particles in sediment chamber 58 from becoming entrained in the upward flow of fluid to discharge pipe 85. In some embodiments spin cone 77 may further comprise one or more diverter plates (not shown) to assist in reversing the rotational flow of fluid. In some other embodiments, and as illustrated in the example of FIG. 17, the reversal mechanism may comprise one or more supporting cross members 79 engaged with vanes 75. In some embodiments, and as illustrated in the example of FIG. 18, the reversal mechanism may comprise vanes 75. In some other embodiments, and as illustrated in the example of FIG. 19, the reversal mechanism may comprise a small deflection plate 72. In some implementations, deflection plate 72 may be engaged to vanes 75 through rod 76. In some embodiments, and without limitation, deflection plate 72 may have a flat surface. However, it is to be appreciated that deflection plate 72 may have a conical, convex, or concave shape in accordance with some embodiments of the present invention.

Figure 21:
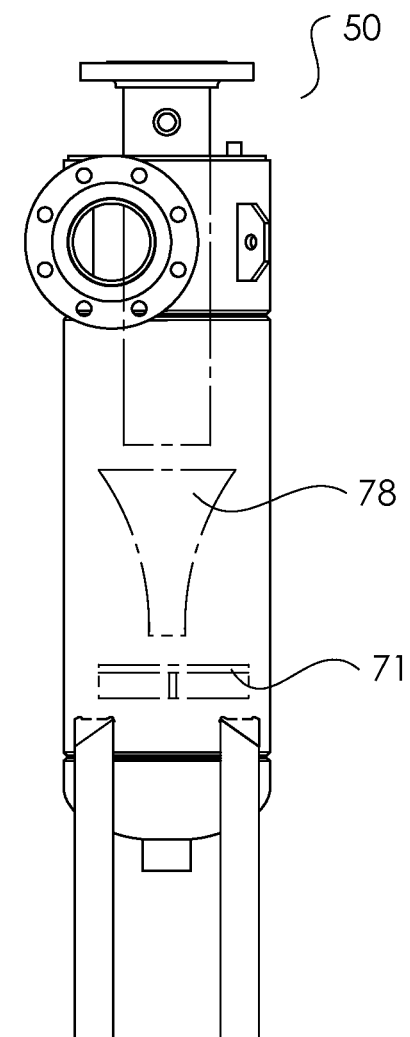
FIG. 21 is a diagram illustrating the reversal mechanism of FIG. 20 and an exemplary centrifugal separator in accordance with some embodiments of the present invention.

In some other embodiments, as illustrated in the example of FIGS. 20-21, and without limitation, reversal mechanism may comprise funnel 78. In some embodiments, the outside diameter of funnel 78 may be smaller than an inside diameter of main body portion 52 of centrifugal separator 50 providing an annular gap between the funnel and the inside wall of main body portion 52. However, in some preferred embodiments, the outside diameter of funnel may be about equal to an inside diameter of main body portion 52 of centrifugal separator 50 such that no annular gap is provided. In some embodiments of the present invention, a centrifugal separator may have a plurality of reversal mechanisms. Referring now to the exemplary illustration of FIG. 21, in some embodiments and without limitation, centrifugal separator 50 may comprise funnel 78 and spin plate 71. It is to be appreciated that in some embodiments of the present invention, a centrifugal separator may comprise a single reversal mechanism (for example, and without limitation, only funnel 78 or only spin plate 71). It is further to be appreciated that other combinations of reversal mechanism are contemplated in accordance with some embodiments of the present invention. For example, and without limitation, a centrifugal separator may comprise funnel 78 and deflection plate 72.

FIGS. 10-14B are detail illustrations of some embodiments of the present invention. Referring now to the exemplary illustrations of FIGS. 10A-10B, in some embodiments and without limitation, velocity chamber 61 may comprise a cylindrical shell that is open on the top and bottom. In some embodiments, an opening may be provided on a lateral surface of velocity chamber 61 for engaging a pipe (for example, and without limitation, inlet pipe 81). Referring to the exemplary illustration of FIG. 11, in some embodiments and without limitation, top cap 65 may comprise a central opening for receiving a pipe (for example, and without limitation, discharge pipe 85). In some embodiments, top cap 65 may comprise air bleed 67. Referring to the exemplary illustration of FIG. 12, in some embodiments and without limitation, inlet pipe 81 may have a partial cutaway for engaging a radial edge of velocity chamber 61. In some examples, and without limitation, the partial cutaway may have a radius about equal to a radius of velocity chamber 61. In some embodiments, inlet pipe 81 may comprise port 82. Referring to the exemplary illustration of FIG. 13, discharge pipe 85 may comprise air bleed 87. In some embodiments, discharge pipe 85 may comprise one or more ports 86. Referring to the exemplary illustration of FIGS. 14A-14B, velocity plate 63 may comprise a curved plate. In some examples, and without limitation, the radius of velocity plate 63 may have a radius about equal to a radius of velocity chamber 61.

Operationally, in some examples and without limitation, a particulate-laden fluid stream under pressure may be introduced into centrifugal separator 50 through inlet pipe 81. In some embodiments, the particulate-laden fluid may be provided by a suction assembly 40 of a basin sweeper. The fluid flow may be restricted by curved velocity plate 63 as it enters velocity chamber 61, thereby inducing a rotational flow in velocity chamber 61 creating a downwardly spiraling vortex. As the helical flow continues downward, it passes between an outer wall of discharge pipe 85 and an inside wall of velocity chamber 61. The particulate-laden fluid flow travels downward slowing in speed as it reaches the interior of main body portion 52. Here, the downward flow encounters and converges upon a reversal mechanism (for example, and without limitation, funnel 78 and/or spin plate 71). Upon encountering the reversal mechanism, the particulate matter is separated from the fluid, and exits into sediment chamber 58 through holes or openings in the reversal mechanism (if provided) and/or the particulate matter is pushed along a surface of the reversal means where it falls between an annular gap between an outer edge of the reversal means and an inside edge of the main body portion 52. The remaining particulate-free fluid reverses direction and continues upward and exits through discharge pipe 85. In some embodiments, the particulate-free fluid may be provided to a sweeper assembly 30 of a basin sweeper. The particulate matter may be periodically purged from sediment chamber 58 through purge outlet 95.

It is to be understood that variations and/or modifications of the present invention may be made without departing from the scope thereof. It is also to be understood that the present invention is not to be limited by the specific embodiments, descriptions, or illustrations or combinations of components disclosed herein. Thus, although reference has been made to the accompanying figures, it is to be appreciated that these figures are exemplary and are not meant to limit the scope of the present invention.

What is claimed is:

1. A centrifugal separator having a cylindrical housing, comprising:
   a. an inlet pipe for receiving a particulate-laden fluid;
   b. an discharge pipe coaxially located in a top portion of said cylindrical housing for discharging substantially particulate-free fluid;
   c. a curved velocity plate located in said top portion of said cylindrical housing and between an inner wall of said cylindrical housing and said discharge pipe; and
   d. at least one reversal mechanism positioned below said discharge pipe and above a sediment chamber in a bottom portion of said cylindrical housing, wherein said at least one reversal mechanism comprises a funnel.

2. The centrifugal separator of claim 1, wherein said at least one reversal mechanism further comprises a spin plate.

3. The centrifugal separator of claim 2, wherein said spin plate comprises at least one hole therein for transferring particulate matter into said sediment chamber.

4. The centrifugal separator of claim 3, wherein said at least one hole in said spin plate comprises a hole located in the center of said spin plate.

5. The centrifugal separator of claim 4, wherein said at least one hole in said spin plate further comprises a plurality of holes around said central hole.

6. The centrifugal separator of claim 3, wherein said spin plate comprises a plurality of holes therein for transferring particulate matter into said sediment chamber.

7. The centrifugal separator of claim 2, wherein said at least one reversal mechanism further comprises vanes.

8. The centrifugal separator of claim 1, wherein said at least one reversal mechanism further comprises a spin cone.

9. The centrifugal separator of claim 8, wherein said at least one reversal mechanism further comprises vanes.

10. The centrifugal separation of claim 1, wherein said at least one reversal mechanism further comprises vanes.

11. The centrifugal separator of claim 10, wherein said at least one reversal mechanism further comprises cross members.

12. The centrifugal separator of claim 1, wherein said at least one reversal mechanism further comprises a deflection plate.

13. The centrifugal separator of claim 12, wherein said at least one reversal mechanism further comprises vanes.

14. The centrifugal separator of claim 1, further comprising an air bleed.

15. The centrifugal separator of claim 14, wherein said air bleed comprises a hole in said discharge pipe.

16. The centrifugal separator of claim 14, wherein said air bleed comprises a hole positioned in said top portion of said cylindrical housing.

17. The centrifugal separator of claim 1, wherein said curved velocity plate has a radius about equal to a radius of said cylindrical housing.

18. The centrifugal separator of claim 1, wherein said inlet comprises a port for a pressure or a flow monitor.

19. The centrifugal separator of claim 1, wherein said discharge pipe comprises a port for a pressure or a flow monitor.

20. A system for filtering particulate matter from a fluid in a collection basin having a basin floor, comprising:
  a. at least one sweeper header located near a first peripheral edge of said basin floor, said sweeper header comprising a plurality of openings therein, wherein at least one of said openings defines a fluid trajectory intersecting a plane of said basin floor;
  b. at least one suction header located near a second peripheral edge of said basin floor, said suction header comprising at least one opening therein; and
  c. a centrifugal separator having an inlet pipe in fluid communication with said suction header, a discharge pipe coaxially located in a top portion of said centrifugal separator in fluid communication with said at least one sweeper header, a curved velocity plate directing fluid from said inlet pipe towards an inner wall of said centrifugal separator, and at least one reversal mechanism below said discharge pipe and above a bottom portion of said centrifugal separator, wherein said at least one reversal mechanism comprises a funnel.

21. The system of claim 20, said discharge pipe further comprising an air bleed hole positioned in said top portion of said centrifugal separator.

22. The system of claim 20, wherein substantially all of said openings in said sweeper header are angled between about 5 degrees and about 35 degrees downward relative to said basin floor.

23. The system of claim 22, wherein two or more of said plurality of openings have different downward angles relative to said basin floor.

24. The system of claim 20, wherein said at least one reversal mechanism further comprises a spin plate.

25. The system of claim 24, wherein said spin plate comprises at least one hole therein for transferring particulate matter into a sediment chamber.

26. The system of claim 25, wherein said at least one hole in said spin plate comprises a hole located in the center of said spin plate.

27. The system of claim 26, wherein said at least one hole in said spin plate further comprises a plurality of holes around said central hole.

28. The system of claim 25, wherein said spin plate comprises a plurality of holes therein for transferring particulate matter into said sediment chamber.

29. The system of claim 24, wherein said at least one reversal mechanism further comprises vanes.

30. The system of claim 20, wherein said at least one reversal mechanism further comprises a cone.

31. The system of claim 30, wherein said at least one reversal mechanism further comprises vanes.

32. The system of claim 20, wherein said at least one reversal mechanism further comprises vanes.

33. The system of claim 32, wherein said at least one reversal mechanism further comprises cross members.

34. The system of claim 20, wherein said at least one reversal mechanism further comprises a deflection plate.

35. The system of claim 34, wherein said at least one reversal mechanism further comprises vanes.

36. The system of claim 20, wherein said curved velocity plate has a radius about equal to a radius of an outer wall of said centrifugal separator.

37. The system of claim 20, wherein said at least one sweeper header comprises two or more sweeper headers and said system further comprises a sweeper manifold connected to said two or more sweeper headers, said sweeper manifold operable to deliver a fluid to said two or more sweeper headers at a substantially equal pressure.

38. The system of claim 37, said sweeper manifold comprising an inlet in fluid connection to said discharge pipe for receiving a fluid, a first conduit leading from said inlet to a first joint connecting a first of said two or more sweeper headers, and a second conduit leading from said first joint to a second joint connecting a second of said two or more sweeper headers, wherein a diameter of said second conduit is less than a diameter of said first conduit.

39. A centrifugal separator having a cylindrical housing, comprising:
  a. an inlet pipe for receiving a particulate-laden fluid;
  b. an discharge pipe coaxially positioned in a top portion of said cylindrical housing for discharging substantially particulate-free fluid;
  c. a curved velocity plate positioned in said top portion of said cylindrical housing and between an inner wall of said cylindrical housing and said discharge pipe, said curved velocity plate having a radius about equal to a radius of an outer wall of said cylindrical housing;

d. a funnel positioned below said discharge pipe and above a sediment chamber in a bottom portion of said cylindrical housing;
e. a spin plate positioned below said funnel and above said sediment chamber, said spin plate having at least one hole therein for transferring particulate matter into said sediment chamber;
f. vanes positioned below said spin plate and above said sediment chamber; and
g. an air bleed comprising a hole in said top portion of said cylindrical housing or said discharge pipe.

40. A centrifugal separator having a cylindrical housing, comprising:
a. an inlet pipe for receiving a particulate-laden fluid;
b. an discharge pipe coaxially located in a top portion of said cylindrical housing for discharging substantially particulate-free fluid;
c. a curved velocity plate located in said top portion of said cylindrical housing and between an inner wall of said cylindrical housing and said discharge pipe; and
d. at least one reversal mechanism positioned below said discharge pipe and above a sediment chamber in a bottom portion of said cylindrical housing,
wherein said at least one reversal mechanism comprises a spin plate, wherein said spin plate comprises at least one hole therein for transferring particulate matter into said sediment chamber, and wherein said at least one hole in said spin plate comprises a hole located in the center of said spin plate.

41. The centrifugal separator of claim 40, wherein said at least one hole in said spin plate further comprises a plurality of holes around said central hole.

42. The centrifugal separator of claim 40, wherein said at least one reversal mechanism further comprises vanes.

43. The centrifugal separator of claim 42, wherein said at least one reversal mechanism further comprises cross members.

44. The centrifugal separator of claim 40, further comprising an air bleed.

45. The centrifugal separator of claim 44, wherein said air bleed comprises a hole in said discharge pipe.

46. The centrifugal separator of claim 44, wherein said air bleed comprises a hole positioned in said top portion of said cylindrical housing.

47. The centrifugal separator of claim 40, wherein said curved velocity plate has a radius about equal to a radius of said cylindrical housing.

48. The centrifugal separator of claim 40, wherein said inlet comprises a port for a pressure or a flow monitor.

49. The centrifugal separator of claim 40, wherein said discharge pipe comprises a port for a pressure or a flow monitor.

50. A system for filtering particulate matter from a fluid in a collection basin having a basin floor, comprising:
a. at least one sweeper header located near a first peripheral edge of said basin floor, said sweeper header comprising a plurality of openings therein, wherein at least one of said openings defines a fluid trajectory intersecting a plane of said basin floor;
b. at least one suction header located near a second peripheral edge of said basin floor, said suction header comprising at least one opening therein; and
c. a centrifugal separator having an inlet pipe in fluid communication with said suction header, a discharge pipe coaxially located in a top portion of said centrifugal separator in fluid communication with said at least one sweeper header, a curved velocity plate directing fluid from said inlet pipe towards an inner wall of said centrifugal separator, and at least one reversal mechanism below said discharge pipe and above a bottom portion of said centrifugal separator,
wherein said at least one reversal mechanism comprises a spin plate, wherein said spin plate comprises at least one hole therein for transferring particulate matter into a sediment chamber, and wherein said at least one hole in said spin plate comprises a hole in the center of said spin plate.

51. The system of claim 50, wherein said at least one hole in said spin plate further comprises a plurality of holes around said central hole.

52. The system of claim 50, said discharge pipe further comprising an air bleed hole positioned in said top portion of said centrifugal separator.

53. The system of claim 50, wherein substantially all of said openings in said sweeper header are angled between about 5 degrees and about 35 degrees downward relative to said basin floor.

54. The system of claim 53, wherein two or more of said plurality of openings have different downward angles relative to said basin floor.

55. The system of claim 50, wherein said curved velocity plate has a radius about equal to a radius of an outer wall of said centrifugal separator.

56. The system of claim 50, wherein said at least one sweeper header comprises two or more sweeper headers and said system further comprises a sweeper manifold connected to said two or more sweeper headers, said sweeper manifold operable to deliver a fluid to said two or more sweeper headers at a substantially equal pressure.

57. The system of claim 56, said sweeper manifold comprising an inlet in fluid connection to said discharge pipe for receiving a fluid, a first conduit leading from said inlet to a first joint connecting a first of said two or more sweeper headers, and a second conduit leading from said first joint to a second joint connecting a second of said two or more sweeper headers, wherein a diameter of said second conduit is less than a diameter of said first conduit.

58. The system of claim 50, wherein said at least one reversal mechanism further comprises vanes.

59. The system of claim 58, wherein said at least one reversal mechanism further comprises cross members.

60. A system for filtering particulate matter from a fluid in a collection basin having a basin floor, comprising:
a. at least one sweeper header located near a first peripheral edge of said basin floor, said sweeper header comprising a plurality of openings therein, wherein at least one of said openings defines a fluid trajectory intersecting a plane of said basin floor;
b. at least one suction header located near a second peripheral edge of said basin floor, said suction header comprising at least one opening therein; and
c. a centrifugal separator having an inlet pipe in fluid communication with said suction header, a discharge pipe coaxially located in a top portion of said centrifugal separator in fluid communication with said at least one sweeper header, a curved velocity plate directing fluid from said inlet pipe towards an inner wall of said centrifugal separator, and at least one reversal mechanism below said discharge pipe and above a bottom portion of said centrifugal separator,
wherein said at least one sweeper header comprises two or more sweeper headers and said system further comprises a sweeper manifold connected to said two or more sweeper headers, said sweeper manifold operable to deliver a fluid to said two or more sweeper headers at a substantially equal pressure, said sweeper manifold comprising an inlet in fluid connection to said discharge pipe for receiving a fluid, a first conduit leading from said inlet to a first joint connecting a first of said two or more sweeper headers, and a second conduit leading from said first joint to a second joint connecting a second of said two or more sweeper headers, wherein a diameter of said second conduit is less than a diameter of said first conduit.

61. The system of claim 60, said discharge pipe further comprising an air bleed hole positioned in said top portion of said centrifugal separator.

62. The system of claim 60, wherein substantially all of said openings in said sweeper header are angled between about 5 degrees and about 35 degrees downward relative to said basin floor.

63. The system of claim 62, wherein two or more of said plurality of openings have different downward angles relative to said basin floor.

64. The system of claim 60, wherein said at least one reversal mechanism comprises a spin plate.

65. The system of claim 64, wherein said spin plate comprises at least one hole therein for transferring particulate matter into a sediment chamber.

66. The system of claim 65, wherein said at least one hole in said spin plate comprises a hole located in the center of said spin plate.

67. The system of claim 66, wherein said at least one hole in said spin plate further comprises a plurality of holes around said central hole.

68. The system of claim 65, wherein said spin plate comprises a plurality of holes therein for transferring particulate matter into said sediment chamber.

69. The system of claim 64, wherein said at least one reversal mechanism further comprises vanes.

70. The system of claim 60, wherein said at least one reversal mechanism comprises a cone.

71. The system of claim 70, wherein said at least one reversal mechanism further comprises vanes.

72. The system of claim 60, wherein said at least one reversal mechanism comprises vanes.

73. The system of claim 72, wherein said at least one reversal mechanism further comprises cross members.

74. The system of claim 60, wherein said at least one reversal mechanism comprises a deflection plate.

75. The system of claim 74, wherein said at least one reversal mechanism further comprises vanes.

76. The system of claim 75, wherein said curved velocity plate has a radius about equal to a radius of an outer wall of said centrifugal separator.

\* \* \* \* \*